May 14, 1957 G. R. MARKOW 2,792,541
REVERSING MAGNETIC AMPLIFIER CONTROL SYSTEM
Filed March 23, 1953 3 Sheets-Sheet 1

INVENTOR.
GEORGE R. MARKOW
BY
Raymond D. Junkins
ATTORNEY

INVENTOR.
GEORGE R. MARKOW
BY
Raymond D. Jenkins
ATTORNEY

May 14, 1957 G. R. MARKOW 2,792,541
REVERSING MAGNETIC AMPLIFIER CONTROL SYSTEM
Filed March 23, 1953 3 Sheets-Sheet 3

INVENTOR.
GEORGE R. MARKOW
BY
Raymond W. Junkins
ATTORNEY

United States Patent Office 2,792,541
Patented May 14, 1957

2,792,541

REVERSING MAGNETIC AMPLIFIER CONTROL SYSTEM

George R. Markow, Cleveland Heights, Ohio, assignor to Bailey Meter Company, a corporation of Delaware Application March 23, 1953, Serial No. 344,120

15 Claims. (Cl. 318—28)

This invention relates to indicating, measuring and control systems, more particularly to those systems which include magnetic amplifiers as elements, and it has, as an object, the provision of a simple, reliable and improved system of this character.

It has long been common practice to unbalance electrical networks by variable conditions to be measured and controlled. The measuring balanceable electrical networks have been maintained in, or returned to, balance by reversible electric motors under the direction, or control, of a separate network sensitive to the unbalance of the measuring network. For the purpose of motor direction, it is necessary that the measuring network unbalance be amplified before utilization by the separate network in control of the motor.

Multi-stage electronic amplifiers have been common for some time. Typical electronic amplifier and motor control circuits, of an early type, may be found in Ryder 2,275,317. Development of these electronic systems have been paralleled by many patents, one of the latest versions being disclosed in Hornfeck 2,544,790. These electronic amplifiers take the unbalance voltage of the measuring network and amplify it to a magnitude whereby it may be used, in a motor control network, for rotating a motor in a direction which will cause balance to be maintained, or restored, in a measuring network.

The electronic amplifying networks are subject to certain inherent disadvantages. Although commendable steps forward have been made in the development of electronic tubes, their reliability has been generally discouraging in industrial controlling electrical networks. It has been a hope, of long standing, that a device would be developed which would substantially replace the electronic tube in function while having a comparatively lengthened life. Metallic cores, associated with current-carrying windings, have been recognized as possible building blocks for the desired networks. Therefore, the present invention presents a practical magnetic amplifier which offers greater reliability than the electronic amplifiers of the patents mentioned above.

It may be more precisely stated that the present invention relates to a system utilizing magnetic amplifiers for controlling reversible loads, represented by electric motors, and it has for a further object the provision of measuring and control systems in which operating losses are reduced to a minimum.

At this time there will be recognized magnetic amplifiers of two general types. Taking the lowest common denominator of the amplifier as being one of its core-winding combinations, termed saturable core reactors, the first type has a pair of reactance windings, on a core, arranged and connected in a circuit so that they tend to produce a reversal of flux in their core during alternate half cycles of the A.-C. current with which they are energized. This reversal of flux in the core during alternate half cycles is produced with respect to the flux produced by a D.-C. energized saturation control winding of the reactor.

In the second type of saturable core reactor, the reactance windings are arranged and connected with rectifiers so that they produce a flux in the reactor which is unidirectional with respect to the flux produced by the D.-C. energized control winding. Greater amplification is normally produced by this latter "self-saturating" type of circuit. This latter type of one-stage magnetic amplifier has been regarded as limited to an input signal of slowly varying current. Taking saturable core reactors of this type, and arranging them in pairs, in a series of amplifying stages, the present invention has produced success in converting a variable signal source of alternating voltage, from a measuring network, into a unidirectional control current which can be applied to the control windings of the reactors to finally produce an alternating current output which can be placed directly in the control winding of a reversible electric motor.

The applicant is confident that this discovery of a reliable apparatus which can take a variable alternating current input, amplify it, and use it in direct control of an electric motor will give great impetus to the use of electrical networks in the indicating, measuring and control of continuous industrial processes. The present invention is directed toward this goal. The reliability and ruggedness of an electro-magnetic network for this function is inherent and evident.

For the disclosed embodiment of the invention, certain core materials, and forms, have been determined which contribute to the improved results. Further, a particular combination for a demodulating circuit has been made with a series of amplifying stages, at least some of which are divided into push-pull sections of single-ended bridge circuits of the "self-saturating" type. Means have been provided, in combination with the reactors of these stages, to preset the magnetic saturation of the metallic core materials. The arrangement provides, for the operating range of the amplifier, as a unit, a maximum of sensitivity and, simultaneously, for the establishment of a true null signal for a minimum input signal.

With the quality of materials presently available, the response time of the present embodiment of the invention has been reduced to approximately one-tenth of a second. The amplification needed, and easily obtained, is of the order of 5000. The shift in the null of the disclosed embodiment, as a push-pull amplifying network, is less than in single-ended electro-magnetic networks. Further, the reliability and ruggedness, with respect to electronic networks, is quite superior.

Briefly, to review and specifically describe the embodiment disclosed, the magnetic amplifier of the present invention has three stages, each stage being divided into two halves, each comprising a saturable core reactor and circuit, the halves of which are connected through control windings which are electrically connected but magnetically isolated. The output circuits of each reactor half of the first two stages are maintained in electrical isolation but are magnetically coupled in the subsequent stage. The arrangement in the last stage produces a variation, proportional in magnitude and matched in phase of alternating current with the alternating current input signal to the amplifier, but at an elevated level which makes it possible for the output to be utilized in the control winding of the reversible balancing motor of a measuring network.

Figure 1:
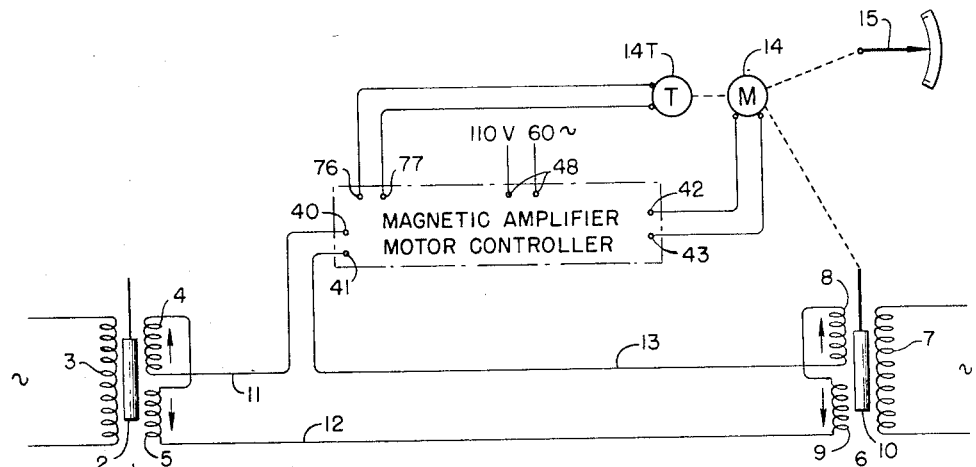
Figs. 1, 2 and 3 are diagrammatic representations of complete measuring balanceable electrical networks with the magnetic amplifier motor controller in combination.

The more perspective concept of the ultimate objects of this invention is gleaned from study of the first three figures of the drawing. For the disclosure of these three figures, considered as a group, balanceable electrical networks have been selected to approximate a cross-section of the myriad of specific balanceable electrical networks which may include the magnetic amplifier motor controller to be disclosed. All such networks have included the multi-stage electronic amplifiers referred to supra.

Figure 4:
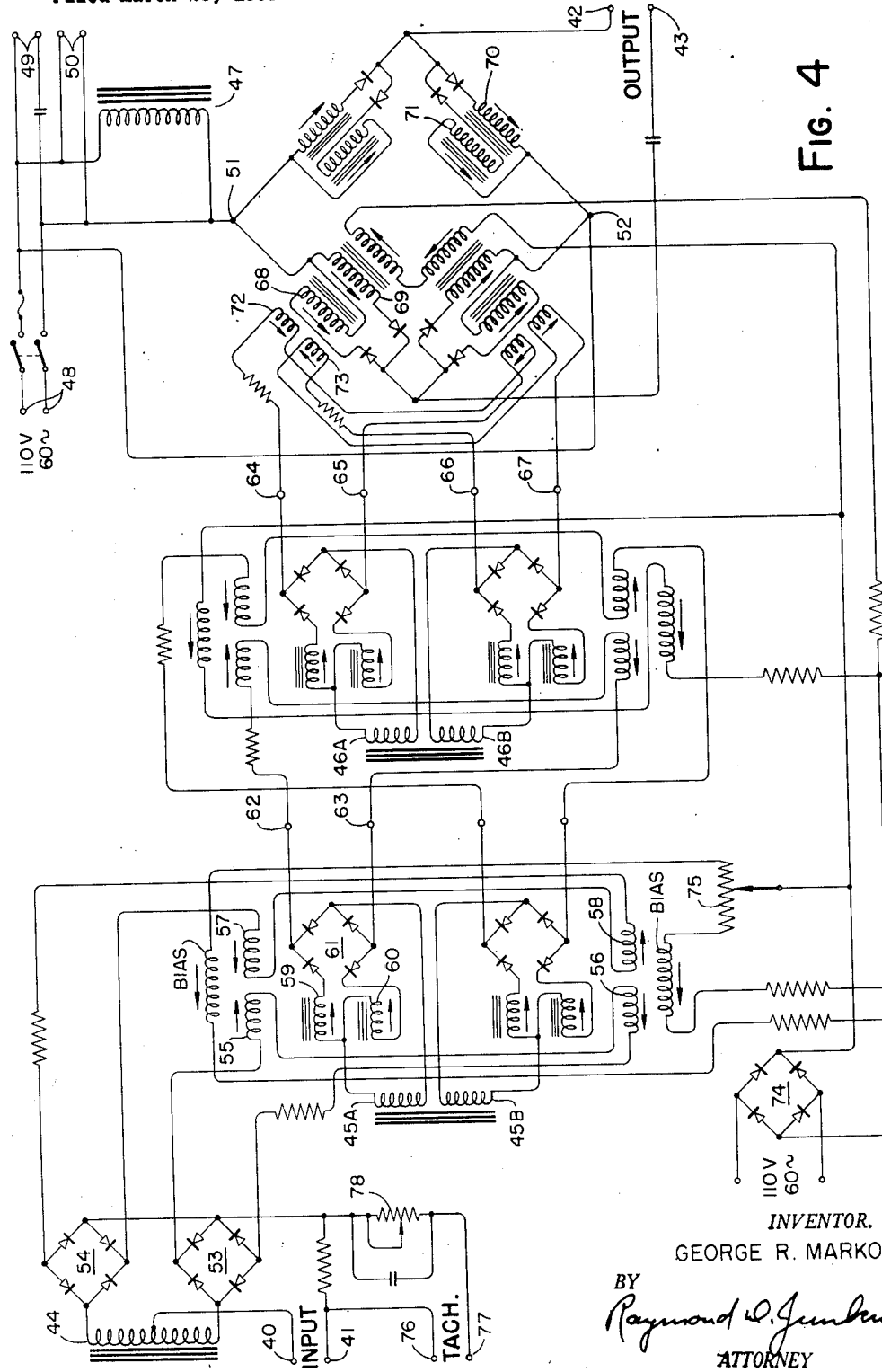
Fig. 4 is a diagrammatic representation of the reactors, electrical components and connections of the magnetic amplifier motor controller.

In these diagrammatic drawings of three networks, including the magnetic amplifier motor controller, designated by legend, the common input and output terminal connections of the controller have been given the same designations in the three figures as used in the detailed wiring diagram of the controller in Fig. 4. All other units of structure in the networks, including the balancing motor and feedback tachometer, are individually designated. The controller is disclosed with, basically, four sets of terminal connections; input error signal terminals, output signal terminals for the balancing motor, input signal terminals from the tachometer driven by the balancing motor and input line terminals from the basic, line, power supply to the controller.

Fig. 1 discloses a measuring balanceable electrical network comprised, essentially, of two movable core transformers. In general, the object is to position the core of a transmitting movable core transformer and compare the resulting output from its secondaries with that of secondaries of a receiving movable core transformer. Differences between the voltage outputs of the secondaries, from the transmitter and receiver, comprise the unbalance signal which must be amplified for control of the balancing motor mechanically positioning the core of the receiver to reestablish, or maintain, balance between the outputs of the two secondaries.

In the specific structure disclosed, the transmitter is generally designated by 1. In the transmitter, a core 2 is positioned by one of any number of variables, or combination of variables. A primary winding 3 is energized by A.-C. and the magnetic flux generated thereby is coupled, through core 2, to secondaries 4 and 5. In this particular arrangement, the windings 4 and 5 are connected to each other in such manner that their voltages will oppose, or buck, each other. The result of this arrangement is that the net output of both secondaries will be at a minimum when core 2 induces equal voltages in each secondary by being positioned midway between them.

The same general arrangement of core and windings is found at the receiver 6. A primary 7 is provided which is in series with primary 3 and the A.-C. source, and equal voltages are induced in secondaries 8 and 9 when core 10 is at the midpoint of its travel.

It should now be apparent, in this arrangement of Fig. 1, that a potential will be generated between output leads 11 and 12 as the measured variable positions core 2 away from its mid-point. As lead 12 is common to one end of both sets of secondaries, the potential generated between leads 11 and 13 is regarded as the error signal input to the magnetic amplifier motor controller legended on the drawings. It is this error signal potential which must be brought to a minimum value by core 10 adjusting the potential output of the receiver 6, to balance that of transmitter 1. Therefore, the magnetic amplifier motor controller electrically controls motor 14 which mechanically positions core 10 to restore, or maintain, the balance between 1 and 6. It is then obvious that the mechanical motion of core 10 may be simultaneously transmitted to an indicator 15 and/or some type of control device which it is not necessary to illustrate.

At 14T is designated an induction generator, or tachometer, mechanically driven from the shaft of the balancing motor 14. With 60 cycles A.-C. used as the basic power supply for the controller, it has been found to make a practical combination when a motor of about 30 R. P. M. maximum speed is used. With about one-tenth of a second time delay in the controller, as presently reduced to practice, a higher speed motor would throw the system into oscillation, or cycling. Additionally, the embodiment of the invention disclosed includes in the combination, this generator, desirable for providing a feedback voltage in series with the input error signal to the controller, to prevent hunting and to provide a smooth, final motion for actuation of the balancing element of the measuring network. Although the terminals for the feedback from the tachometer, into the controller, are clearly designated, the drawing is not additionally encumbered with indicating the source for the excitation of the tachometer windings on these first three figures. Actually the exciting field winding of the tachometer may be placed directly across the line supply, with terminal connections physically located on the controller housing to centralize the connections. This may be a little more clear from a subsequent consideration of Fig. 4.

Figure 2:
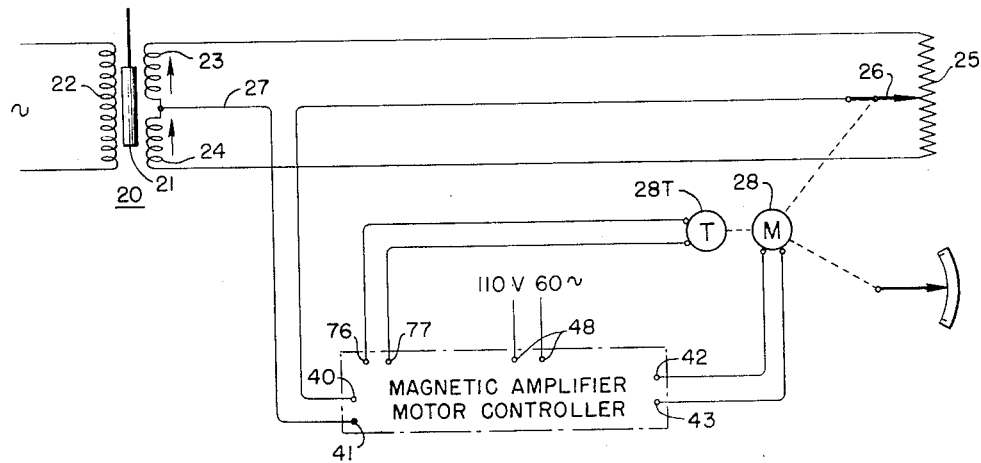

Fig. 2 illustrates another arrangement for balancing the output of a movable core transformer which is responsive to a variable to be measured. Also, by this second arrangement, is indicated the flexibility in the variation of the secondary windings associated with these transformer devices. A transmitting movable core transformer 20 is shown with a core 21 positionable with respect to a primary 22 whose flux is linked, by the core, to the secondaries 23 and 24. In this circuit, however, secondaries 23 and 24 are connected so that their individual outputs are aiding each other.

At the receiver of the circuit of Fig. 2, a slidewire 25, with a movable contactor 26, is connected across the outside terminals of secondaries 23 and 24. The arrangement of secondaries 23 and 24, along with the divided slidewire 25, may be considered, effectively, as components of a Wheatstone bridge. Therefore, lead 27, connecting the mid-point of secondaries 23 and 24, may be considered, with contactor 26, as ends of the conjugate of the bridge. With unbalance of the bridge brought about by movement of core 21, under the influence of the measured variable, restoration of balance is brought about by movement of contactor 26 along its slidewire 25. Motor 28 actuates contactor 26 under the direction of the magnetic amplifier motor controller which is connected between 26 and 27, the ends of the conjugate of the bridge. The function of tachometer 28T is similar to that of 14T in the circuit of Fig. 1.

Figure 3:
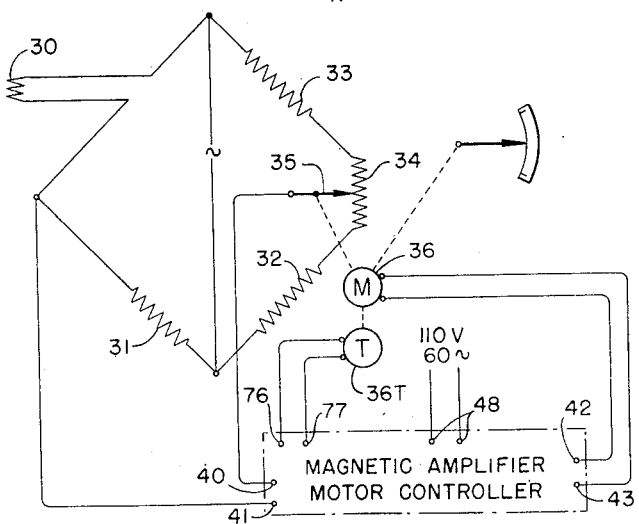

In Fig. 3 there is depicted a more clearly discerned Wheatstone bridge, one of whose legs is sensitive to a variable condition to be measured. In this particular arrangement, a resistance 30 is disclosed as the leg of the Wheatstone bridge which varies in ohmic value with the temperature condition to which it is exposed. Resistances 31, 32 and 33 are the stable legs of the bridge. Further, resistance 34 is arranged in series between legs 32 and 33 in order that it may distribute its value between bridge halves for the maintenance of balance in the bridge. Contactor 35, one end of the conjugate, is positioned, for this distributing function, by motor 36. The magnetic amplifier motor controller is disclosed as in the conjugate of the bridge in order that a voltage appearing in the conjugate will direct motor 36 in its positioning of contactor 35. Again, tachometer 36T functions as does 14T and 28T in their networks.

These few ararngements, of the first three figures of the drawings, are to be taken as merely indicative of the multitude of specific balanceable electric networks possible, and well known, in the power producing and process industries. With these networks, variable conditions are detected and their value indicated and/or recorded, as well as control exerted, over a supply to the condition which restores the condition to a desired potential, or otherwise modifies it. The primary objective of the preceding disclosure is the illustration of practical combinations including an efficient, and simple, magnetic amplifier motor controller in varied types of balanceable electrical networks.

Before going to Fig. 4, specifically, the certain materials and structural arrangements in the controller should be considered, regardless of the combinations made with the controller and the uses to which it is put. Rectifier units are used throughout the various components of the magnetic amplifier motor controller, and exhaustive tests have been conducted to determine the most reliable and efficient type presently available. Selenium rectifiers have been found to be most desirable, from the standpoint of stability and economy. A most important consideration was found to be the variation of the back resistance of the rectifiers with temperature. A temperature range from 40 to 140° F. is a practical consideration for most installations, and selenium rectifiers have been chosen for their relatively stable characteristics within this range.

Regarding core materials and forms for the reactors of the magnetic amplifier motor controller, it is, of course, desirable that the embodiment of the invention be given the advantage of the most efficient materials developed for this purpose. Magnetic nickel-iron alloys of high permeability are available from at least the Arnold Engineering Company of Illinois. Core materials made of these alloys are satisfactory if they are grain-oriented and have substantially rectangular hysteresis loops as well as a high residual induction and low coercive force.

Deltamax, available through the Arnold Engineering Company, is grain-oriented 50 percent nickel-iron alloy having a rectangular hysteresis loop and is well known for its use in saturable core reactors. The reactors of the final, output stage are made of Deltamax in the actual reduction to practice of the preferred embodiment because of the relatively large power needed.

Supermalloy is the latest development in the field of high permeability nickel-iron alloys. It exhibits the highest initial and maximum permeability of any known commercially available material, and also has the lowest hysteresis loss. The reactors of the first two stages are made of Supermalloy to take advantage of its greater sensitivity to the control exerted by the input signal.

The cores are fabricated by continuously winding thin, insulated strip about a mandrel to produce a toroidal, square, or rectangular shape. Cores of this type have been denoted variously as clock-spring cores, centricores, or more descriptively as continuous tape wound cores. Since Deltamax and Supermalloy are strain sensitive, it has been commercial practice to encase toroidal cores of these materials in plastic containers to prevent any depreciation of magnetic properties either by handling or by subsequent wire winding. The combination of these core materials and forms, with the particular circuit of the invention, has produced functions which are definitely forward steps in the field of magnetic amplifiers.

The necessarily diagrammatic nature of the disclosure of Fig. 4 may tend to mislead the unwary student. A consistent convention has been adhered to, although the actual physical relation of the reactor cores is not readily evident from Fig. 4 only. Vertical divisions between the three stages are easily seen. Horizontally, each of the stages is divided into halves. Each of these stage halves includes a saturable core reactor with two of the toroidal cores. The windings and the cores are disclosed in Figs. 5 and 6. The arrangement generally permits all of the reactors to be stacked on top of each other. The resulting cylinder may be then encased, permanently in a molded plastic body. All the winding connections are made to a common terminal board which forms part of the wall of the encasing body. The resulting, over all combination of the controller, even with the necessary transformers and groups of rectifiers, is a compact unit which compares favorably, in size, with the conventional electronic amplifier.

Turning now, specifically, to Fig. 4, there is illustrated, diagrammatically, the essential electrical components, and their connections, in the magnetic amplifier motor controller. The input terminals from the measuring circuit are shown at 40 and 41. The output terminals are shown at 42 and 43, and between these two sets of terminals are the three stages of the magnetic amplifier motor controller as well as the section for phase sensitive rectification of the A.-C. input signal.

Having located the input and output terminals, the designations of the basic power supply for the various components of the circuit should next be located. The primary winding of the main transformer is shown in Fig. 4 at 47. The various secondaries, common with the single primary winding, are shown (heavy line cores) as the basis of supply for the demodulating bridges and the first two stages of the amplifier. It will have to be carried in mind that secondaries 44, 45A, 45B, 46A and 46B have a single primary 47 to which they are coupled in a unitary transformed. Additionally, the line supply of a 110 volts 60 cycles A.-C. for the controller is shown. The line supply is depicted as coming to the controller through terminals 48, going through a main switch, and then supplying the balancing motor power winding through terminals 49, the induction generator and movable core primary excitation through terminals 50 and the last stage of the controller through terminals 51 and 52. Thus oriented, the description can proceed from the input terminals 40 and 41, step-by-step, to the output terminals 42 and 43.

The input A.-C. error voltage is first rectified by a two-bridge type of demodulating circuit. Bridges 53 and 54 of this demodulating circuit are supplied from center-tapped secondary 44. This secondary 44 is sized to raise the output of the briges high enough to operate the selenium rectifiers within their effective range. This arrangement results in the D.-C. output of the bridges being high, compared to the A.-C. error input signal. Despite this differential in magnitude, the input variation alters the proportions between the two rectifying bridge outputs.

There are a total of eight selenium rectifiers used in these demodulating bridges. These eight rectifiers are arranged in two groups of four, and each of the two groups are arranged in bridges as shown at 53 and 54. With a zero input on terminals 40 and 41, the two outputs of the bridges 53 and 54 are at a constant ratio of approximately unity. With an A.-C. error signal at 40 and 41, this ratio between the bridge outputs changes in one direction or the other from unity, dependent on the phase of the A.-C. input, and in proportion to its magnitude.

The outputs from demodulating bridges 53 and 54 are then taken into the control windings of the first stage of the controller to establish their magnetic flux in the cores of the first stage. In a general sense, there are output windings on each of these cores which have current flowing in them from secondaries 45A and 45B, and their currents, under the control of the D.-C. signals from bridges 53 and 54, are converted into two D.-C. signals whose difference is amplified with respect to the input at terminals 40 and 41 and utilized to establish the magnetic flux in the cores of the second stage.

In the second stage, the process is repeated, producing D.-C. signals, their difference further amplified with respect to the input at terminals 40 and 41. In the third stage, the process is again repeated, however, the arrangement in this third stage provides an A.-C. signal, amplified with respect to the A.-C. error input signal on terminals 40 and 41, which may be taken from terminals 42 and 43 into the control winding of the balancing motor of measuring networks such as depicted in the first three figures.

Turning from the over-all consideration of the operation of the controller circuit, a closer consideration is given from the specific arrangement of bridges 53 and 54 which are connected such that the error signal at terminals 40 and 41 adds to the output of one bridge and subtracts from the other. In other words, the input to the controller is connected differentially to the two separate outputs of the demodulator bridges 53 and 54.

Input windings 55 and 56, to the first stage, are connected in series with each other and in the output of bridge 53. Input windings 57 and 58 are connected in series with each other and in the output of bridge 54. The circulating currents from the bridges establish magnetomotive forces in each of the two sets of cores in the first stage saturable reactors so as to oppose each other in that set. With the ratio of the magnitudes of the D.-C. voltage outputs of the two bridges 53 and 54 varying in a direction from unity, dependent upon the phase of the A.-C. input error signal, a net M. M. F. is established in each of the two cores of the two reactors of the first stage. The input windings of each half stage not only buck each other but their net M. M. F.'s buck each other as between stage halves. The bucking, or coupling, between the two windings of each half stage, is solely magnetic. Electrically, the input circuits are isolated from each other within each reactor. The net M. M. F. of each reactor being opposite to the reactor in the other half, the two outputs of a stage vary from each other, from unity, in opposite directions. However, as between half stage reactor outputs, there is both electrical and magnetic isolation.

Focusing attention on the upper half of the first stage, with its input windings 55 and 57 establishing their net M. M. F., it must next be noted that output windings 59 and 60 are arranged in the reactor, on separate cores, so that their reactances are changed together. Further, windings 59 and 60 are arranged in a "self-saturating" circuit with rectifying bridge 61, so that current will pass through them in only one direction.

Now take the transformer secondaries 45A and 45B. Each of these secondaries supplies a pair of output windings in the reactor of a half-stage. The output windings, and rectifiers of 61, can now be looked upon as a bridge having two adjacent legs, each including an output winding and a rectifier. The other two adjacent legs include a rectifier each. The bridge so formed is then supplied by secondary 45A and delivers a D.-C. potential to terminals 62 and 63 proportional to the net M. M. F. which is established by the currents of windings 55 and 57. With the net M. M. F. of each pair of input windings establishing a D.-C. potential proportional to the net force of each pair, the variation from unity ratio between the D.-C. potentials, in direction and magnitude, follows the ratio of the outputs of bridges 53 and 54, and thus a push-pull system is evolved.

It can well be noted, at this point, that basic electromagnetic theory has been tempered in explaining the interaction between the input and output windings of the saturable reactors. The practical aspects of this function are generally well known. The saturation curve of magnetic material is familiar to one skilled in this art, and the variation of the reactance of a winding about a core of magnetic material, over the range of core magnetization is well established. This fundamental characteristic is used in the present invention in the conventional manner. The core of magnetic material can be selectively desaturated, or preset, by a constant D.-C. current in an associated winding establishing a magnetically bucking flux, which opposes the flux of the output windings. The net M. M. F. of the input windings can then vary the reactance of the output windings from a point of selected sensitivity, or change, along the saturation curve of the reactor. This is, basically, the end result of the well-understood electro-magnetic circuit theory of saturable core reactors.

Figure 5:
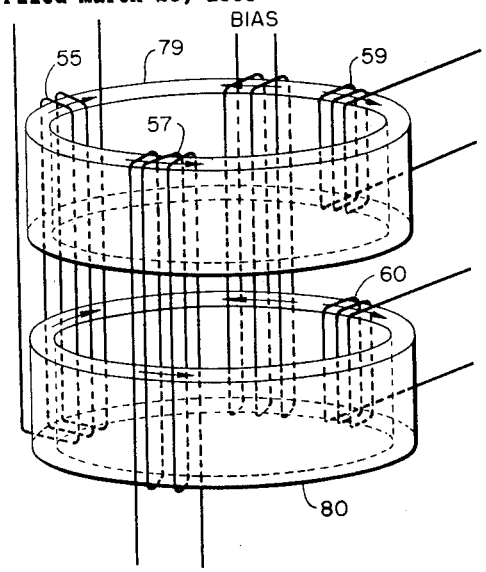
Figs. 5 and 6 are diagrammatic representations of the structural relationship of the windings and magnetic cores of the saturable core reactors of the stage halves of the magnetic amplifier motor controller.

Turning, for the moment, to Fig. 5, it may be seen clearly, if diagrammatically, how the arrangement is physically made between windings and cores in each half of the first two stages to establish and control M. M. F.'s in the reactors. Arrows have been associated with each winding to indicate the direction of circulating currents, and, consequently magnetomotive forces established in the cores, in order to show the relationship of the forces involved. Input windings 55 and 57 can be seen as common with both cores of the upper half of the first stage. Individual output windings 59 and 60, on their individual toroidal cores, have a current flowing in them from secondary 45A and which is controlled by the M. M. F. established in the cores by the opposed circulating currents in control windings 55 and 57.

It is deemed unnecessary to encumber the drawing with specific designations of the output terminals of the lower half of the first stage. The circuit can be readily traced to determine how the input windings of the second stage are connected to each of the output circuits of the two halves of the first stage to give a magnetic coupling in the second stage between the output circuits of the first stage halves but with electrical isolation between them. Again, in general, with the ratio of the output magnitudes of the stage halves varying from unity in either of two directions, and the circuits magnetically coupled in the subsequent stage, a push-pull operation is the result with respect to the change in phase of the input error signal at 40 and 41. In other words, the change in output, from the magnetic amplifier motor controller, is possible in either of two directions from a minimum level, as the error signal changes in magnitude in one, or the other, of its two phases.

The advantage of the magnetic coupling of the outputs of the first two stages is found in at least a saving in the number of turns required for the output reactance windings in the circuit giving push-pull operation. The preferred arrangement is carried out in the first two stages. The arrangement of the last stage, necessary to deliver an A.-C. signal output, illustrates how the output windings must be provided with sufficient turns to carry the entire line voltage.

The operation, and a practical working knowledge of the theory of operation, has now been covered. Specifically, the function of the first two stages, their individual reactors and the interrelation between their reactors, is clearly disclosed. The disclosure of the third stage has a different problem, because its output is to be A.-C. for the operation of the reversible balancing motor. The input to the third stage windings comes to terminals 64–67, from the second stage output bridges, and the output goes to terminals 42 and 43.

Two possible arrangements for the third stage are disclosed. The choice between these arrangements appears arbitrary. If the Fig. 4 arrangement is used, there is no center-tapped transformer for the A.-C. supply to the stage. If, as disclosed in Fig. 7, a center-tapped transformer is used, there are two rectifiers and two windings less to each half-stage, or reactor, by actual count of components, but both the windings and rectifiers used must be twice the size of those of Fig. 4. However, both arrangements are disclosed as practical embodiments for the third stage.

First look upon the third stage circuit of Fig. 4 as being a simple, balanceable bridge network, supplied an energizing A.-C. voltage at terminals 51 and 52 and delivering an output to terminals 42 and 43. Then reactance windings 68 and 69, with their rectifiers, would comprise one leg while reactance windings 70 and 71, with their rectifiers, would comprise an opposite leg. These two opposite legs are wound on the cores of a single reactor, each leg-half being wound on a different core; 69 and 70 on one core and 68 and 71 on the other core. See Figure 6 for the arrangement.

Control windings 72 and 73 are wound common to both cores of their half-stage reactor. The net M. M. F. established by the windings 72 and 73 then acts on all four windings of the reactor simultaneously and in the same direction. With the reactifier pairs arranged in pairs with each pair of leg windings, as disclosed in Fig. 4, there is delivered, to output terminals 42 and 43, an A.-C. voltage having a phase dependent on the direction of the net M. M. F. and a magnitude proportional to the magnitude of the net force.

The foregoing description of the forces, input and output, was deliberately confined to a single reactor comprising opposite legs of the third stage bridge. The second reactor of the third stage is identical in arrangement and function, the forces being in the opposite direction with respect to phase and magnitude of the A.-C. supply at terminals 51 and 52. The result is, again, a push-pull effect with respect to the phase and magnitude of the output signal delivered to 42 and 43. The comparatively small D.-C. signals of terminals 64–67 control the comparatively large A.-C. supply of terminals 51 and 52, to deliver an output to terminals 42 and 43 which varies in phase and magnitude with the variation in direction and magnitude, from unity, of the D.-C. potentials between 64, 65 and 66, 67.

There is still another set of windings associated with each set of saturable reactor cores in the three stages. These windings supply the D.-C. M. M. F. bias for the cores of all three stages and are supplied by a single bridge of rectifiers. The allowable distortion of the D.-C. signal for this bias circuit is not particularly critical. Should the over-all design appear to be materially improved in some specific embodiment, a choke, or other filtering means, may be included in the output of the bridge rectifier supplying the bias network.

Rectifier bridge 74 is disclosed, as the source for the bias windings and must be evisioned as supplied from the line terminals 48. The limitations of this specific drawing disclosure make this evisionment desirable. It is not deemed necessary to specifically designate, by number, each of the windings as associated with each half of each of the three stages.

It is well, however, that it be pointed out that the bias windings of all three stages are arranged in separate circuits supplied by source 74. A potentiometer at 75 sets the ratio of the bias between the windings of the two halves of the first stage.

The general purpose of a M. M. F. bias in reactors of magnetic amplifiers has been explained previously. The basic degree of saturation of the cores must be preset by a fixed amount to position the operating range of the stage on the most sensitive portion of the input-output curve of operation. Production manufacturing procedure has not been refined to the point where there is complete uniformity in core structure, resistances, rectifiers or windings. There is always some degree of unbalance between sections of a push-pull amplifying system. The systems basically operate on a ratio basis between the outputs of two structures, and as long as these structures are made on a production basis, there will be some differences in the outputs of their combination.

A means for setting the true null in this embodiment of this invention is found in potentiometer 75. With a zero, or minimum, input on terminals 40 and 41, the output at terminals 42 and 43 may be brought to a minimum value by an adjustment of potentiometer 75. This adjustment in the first stage is most effective as far as the complete controller is concerned because it is a correction applied before any magnification.

A review of the third stage shows it to include a bridge circuit with four similar arms, one diagonal energized from an A.-C. source and the other supplying a single A.-C. output variable in phase and magnitude with the direction and proportionate magnitude of the ratio of two D.-C. signals, each variable from unity in opposite directions. These signals are supplied to the bridge by inductive transfer to the two parallel coils forming one of each pair of opposite arms and all arranged on two saturable core means. The parallel coils are the output windings and are connected to oppositely poled rectifiers. The signal windings are oppositely poled on each core and reversed on adjacent arms of the bridge. Each pair of oppositely poled signal windings is provided with a D.-C. bias winding, those on adjacent arms being poled oppositely in respect to the signal windings thereon connected in the same signal circuit.

To introduce the benefits of feedback in this controller network, the induction generator (tachometer for example) previously mentioned, is actuated by the balancing motor driven by the output from terminals 42 and 43. Also as indicated previously, the energization for the field of this generator has been provided at terminals 50. Terminals 76 and 77 are now disclosed for bringing the generator output back into the controller circuit in series with the input coming into terminals 40 and 41. A potentiometer 78 is arranged in this series circuit and is referred to as a stability potentiometer which will enable operating personnel to give optimum motor balancing action.

There is still another circuit component of this three-stage magnetic amplifier motor controller which should be discussed. It should be noted, from the disclosure of Fig. 4, that a pair of resistances are placed in the input circuits of each stage. For example, the circuit including demodulating bridge 53 and windings 55 and 56 also includes another resistance element. A second resistance is included in the circuit of bridge 54 and windings 57 and 58. There are additional pairs of resistances, similarly placed, in the input circuits of each of the following two stages.

These resistance pairs determine the net ratio of the inductance to the resistance of each stage. A specific value for these resistance pairs was determined which would result in a satisfactory compromise between the gain needed through all the stages and the maximum allowable time-delay.

In analyzing the final function required of the controller, core and wire size, as well as the number of A.-C. winding turns, was determined which would produce the required power from the reactors. Knowing the maximum error signal input to the controller, from the measuring network, and approximate requirements of time-delay, the number of stages was determined which would give the required amplification without exceeding the maximum permissible time-delay.

The procedure of working back from the requirements on the final stage, by including other stages, worked out very well. Approximately, the gain, or amplification, multiplied upon increase of the number of stages, but the time-delay introduced at the same time merely added. A multiplicity of stages resulted, three for the specific embodiment disclosed. This brought the needed voltage gain, in the order of 5000, without exceeding the maximum time-delay, in the order of one-tenth of a second, within approximate grasp for the specific circuit in which the embodiment disclosed was included.

The pairs of resistances were next adjusted in value in each stage input circuit. These resistances, as indicated supra, set the ratio of the inductance to the resistance of each stage. Once determined these resistances distribute the total gain and time-delay through the various stages so that the controller positions the reversible motor as quickly as practical, and with maximum gain, taking all the other component functions into consideration. Before going to a specific consideration of the alternate arrangement for the circuit of the third stage, shown in Fig. 7, discussion of the reactor structure will be had from the disclosure in Figs. 5 and 6. The cores of these reactors are toroidal in form and have a rectangular cross-section. The electro-magnetic properties of the material of the cores are very sensitive to mechanical strain, so plastic containers are used to mechanically insulate the cores from the pressure of the winding coils. It is not necessary to depict these plastic shields as they would contribute nothing toward an understanding of the function of the reactors. The two reactors disclosed are representative of the actual structure of Fig. 4, Fig. 5 representing the first two stages and Fig. 6 the third stage. The reactors of the third stage circuit of Fig. 7 will be essentially the same as those of Fig. 5.

In all reactors the input windings are wound common to both cores. This is true for both the input error signal as well as the bias input. The output windings are split for association with each core separately. In this embodiment the D.-C. input, or control, windings are actually quite small in number of turns compared with the A.-C. output windings. For example, in the first stage reactors there are but 120 turns of D.-C. windings on each reactor while the A.-C. windings are given 3500 turns/core of each reactor. In the second stage reactors there are 6000 turns/core of A.-C. windings to 100 turns/reactor of D.-C. windings. In the third stage there are two A.-C. windings of 5000 turns/core and only 80 turns/reactor of D.-C. windings. These windings are shown in correct direction in Figs. 5 and 6 but are diagrammatically disclosed in number of turns and relative positions with respect to their cores. Actually each winding extends around the complete circumference of the core, in a layer of turns, and the layers of the separate windings are arranged on top of each other.

In the first two stages, cores 79 and 80, of the reactors are stacked on top of each other. The perspective drawing shows only enough vertical separation to clearly illustrate which windings are common to both cores and which are separately wound on each core. It may be assumed that Fig. 5 shows the reactor of the upper half of the first stage of Fig. 4. The input windings 55 and 57 buck each other to establish a net M. M. F. in either direction and in each core simultaneously. Arrows indicate the direction, at balance, of the forces in the cores. Output windings 59 and 60 individually establish magnetomotive forces in each of cores 79 and 80 and in the same direction. Thus the net M. M. F. of the input either aids or bucks the output windings to vary the current flow in their circuits. The bias is unidirectional in bucking the output in order to desaturate the core back to the most sensitive position of its range. Arrows for each winding are used to show all of these force relationships in the reactor.

Figure 6:
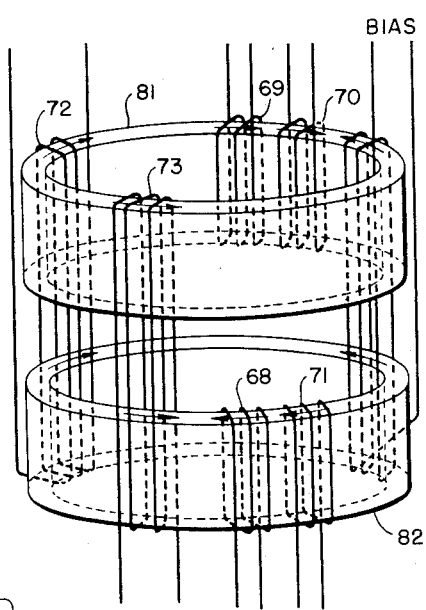

In Fig. 6 the same scheme of disclosure is used as in Fig. 5. However, the output windings 68-71 are given the arrangement previously described as necessary in the third stage circuit of Fig. 4. Cores 81 and 82 differ from cores 79 and 80 in material because of the larger power needed in this final stage.

Figure 7:
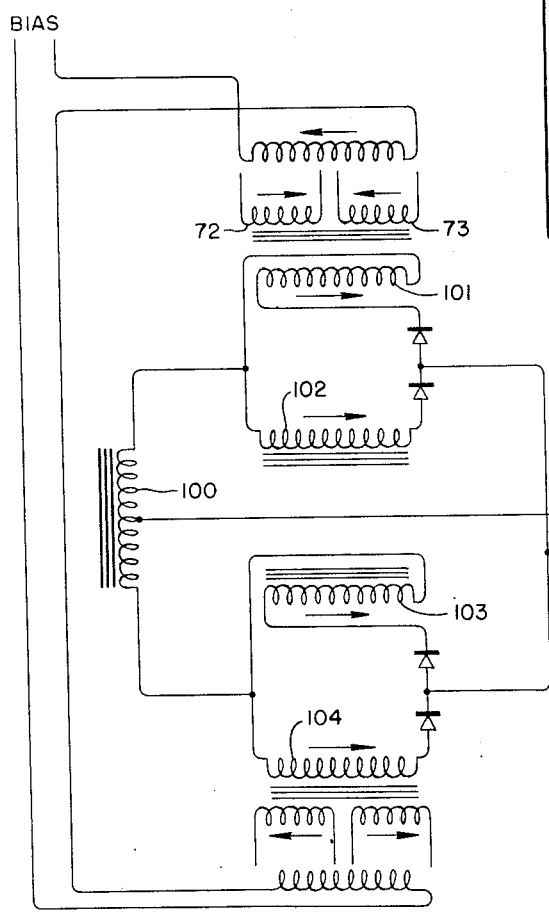
Fig. 7 is an arrangement, alternate to that disclosed in Fig. 4, of the last stage of the magnetic amplifier motor controller.

Turning now to Fig. 7, there is disclosed the second of the alternate circuit arrangements for the third stage of the magnetic amplifier motor controller. In a broad sense, this circuit arrangement is built about a center-tapped transformer secondary 100.

In this circuit organization of Fig. 7, the input windings 72 and 73 are shown as associated with the saturable core reactor of a third stage half in order to impose their net flux, produced by their opposed M. M. F's, on the flux of the output windings 101 and 102. Here again, arrows have been associated with each reactor winding of the drawing to denote the relationships between the circulating currents and flux of the reactors, but without regard to their relative magnitudes at any particular time. This arrangement gives as universal a disclosure as possible within the limitations of drawing designation, and it can be easily derived how the change in magnitude of the M. M. F.'s of the input windings 72 and 73, produce the desired output from windings 101 and 102.

The output of center-tapped secondary 100 should next be considered. Each half of secondary 100 is in circuit with the control winding of the balancing motor of the measuring network. With balanced inputs in the four control windings, there is no net flux or M. M. F., from this source, which acts on the currents of the output windings 101-104. Consequently on each half cycle of the A.-C. supply from secondary 100, there is, effectively, no voltage across output terminals 42 and 43.

Now take the condition when an A.-C. error signal appears at terminals 40 and 41. Depending on the phase of this error signal, the flux produced by one control winding in each half stage reactor will increase while the flux produced by the opposing control winding will decrease. The resultant, or net, flux in each half stage reactor will change in direction, with respect to the current direction in that half stage output winding pair, and the output voltage across output terminals 42 and 43 will be of a phase determined by the direction of the net flux in the half stages.

To conclude and review, the bias windings energized from rectifying bridge 74 desaturates the cores of the reactor, driving them back to the point where satisfactory sensitivity is obtained. In other words, the bias places the operating range of the control windings over that section of the saturation curve of the core material of the saturable reactors which gives the greatest change in saturation of the core for the smallest change in the differential of flux between the control windings.

What I claim, and desire to secure by Letters Patent of the United States, is:

1. A magnetic amplifier motor controller including, a pair of bridge rectifiers receiving an A.-C. input error signal and providing two separate output D.-C. voltages in two circuits which vary from unity ratio in magnitude dependent on the phase and magnitude of the error signal, a first stage comprised of a pair of saturable core reactors whose input circuits are connected to the D.-C. output circuits of the bridge rectifiers in an arrangement which places the inputs in opposition within each saturable core reactor and whose outputs are two separate D.-C. voltages in two circuits, a second stage comprised of a pair of saturable core reactors and whose input circuits are connected to the D.-C. output circuits of the first stage and which inputs are placed in an arrangement which places the inputs in opposition within each saturable core reactor and whose outputs are two separate D.-C. voltages in two circuits, and a third stage comprised of a pair of saturable core reactors whose input circuits are connected to the D.-C. output circuits of the second stage and which inputs are placed in an arrangement which places the inputs in opposition within each saturable core reactor and whose joint output is an A.-C. voltage of large magnitude relative to the A.-C. input error signal to the pair of bridge rectifiers and which varies in phase directly and magnitude proportionately with the input.

2. The controller of claim 1 including a resistance in the input circuit of each saturable core reactor and fixed in value to distribute the gain and time-delay among the stages.

3. The controller of claim 1 including a single transformer having a separate center-tapped secondary individually and separately energizing the pair of bridge rectifiers and separate secondaries energizing the first stage saturable core reactors and the second stage saturable core reactors while the output windings of the third stage saturable core reactors are energized by the A.-C. line source for the transformer primary.

4. The controller of claim 3 including a bias winding associated with each saturable core reactor of the three stages energized by a D.-C. to oppose the self saturation thereof and predetermine the saturation of the cores of the reactors, each bias winding opposing and aiding windings in different D.-C. input circuits in each stage, whereby the half stages of each stage are unbalanced in output.

5. The controller of claim 4 in which a means is provided for simultaneously and manually adjusting the predetermined saturation of the first stage reactor cores by the D.-C. bias windings.

6. The controller of claim 5 in which the manual means increases the saturation of one reactor of the first stage while decreasing it in the other reactor of the first stage.

7. A magnetic amplifier motor controller including, a rectifying network which receives the A.-C. input error signal and establishes two separate D.-C. outputs whose proportionate magnitudes vary in two directions from unity in dependency upon the phase and magnitude of the A.-C. input, a pair of input reactance windings in series with each of the rectifying network outputs so that the circulating currents in the pairs establish two separate sets of flux which oppose each other, a first set of two pairs of magnetically saturable cores with each pair of the reactance windings wound common to each pair of cores, two pairs of separately energized output windings wound separately on each pair of cores, a rectifying bridge in circuit with each pair of separately energized output windings and having separate outputs whose proportionate magnitudes vary in one of two directions from unity in dependency upon the flux differential established by each pair of reactance windings wound common to each pair of cores, a second set of two pairs of cores with windings similar to those on the first set and with the input reactance windings connected to the rectifying bridges of the first set, a rectifying bridge in circuit with each pair of separately energized output windings of the second set of cores and having separate outputs whose proportionate magnitudes vary in one of two directions from unity in dependency upon the flux differential established by each pair of reactance windings wound common to each pair of cores, and a third set of two pairs of cores with input reactance windings similar to the first two sets and connected to the rectifying bridge output circuits of the second set but with output windings and rectifiers arranged in a single bridge circuit whose output is an A.-C. signal which varies in phase and magnitude with the direction and magnitude of the ratio of the second set output variation from unity.

8. The controller of claim 7 in which there are two output windings to each pair of cores of the third set and the windings are arranged in two loop circuits and both loop circuits are connected in a loop circuit including a center-tapped secondary, and an A.-C. output circuit is formed from the center-tap of the transformer and the opposite side of the including loop circuit.

9. The combination with an electrical measuring system including a balanceable electrical A.-C. network sensitive to a condition to be measured, an A.-C. reversible motor mechanically connected to move an element of the network to maintain the balance of the network, and means actuated by the motor for indicating the mechanical balance movement of the element as the change in the condition to be measured; of a magnetic amplifier motor controller responsive to the network unbalance and directing the motor rotation and speed including, a pair of powered bridge rectifiers of unity output ratio, means to differentially apply the A.-C. unbalance signal from the measuring network to the bridge inputs to establish two separate output D.-C. voltages in output circuits which vary from unity ratio in direction and magnitude dependent on the phase and magnitude of the A.-C. unbalance signal from the measuring network, a first stage comprised of a pair of saturable reactors whose input circuits are connected to the D.-C. output circuits of the bridge rectifiers and which input circuits are placed in opposition within each saturable reactor to establish two electrically isolated D.-C. voltages in two output circuits, a second stage comprised of a pair of saturable reactors and whose input circuits are connected to the D.-C. output circuits of the first stage and which input circuits are placed in opposition within such saturable reactors to establish two electrically isolated D.-C. voltages in two output circuits, and a third stage comprised of a pair of saturable reactors whose input circuits are connected to the D.-C. output circuits of the second stage and are placed in opposition within each of the saturable reactors of the third stage and which are connected to establish a single A.-C. voltage in an output circuit adapted to energize the A.-C. reversible motor and varies in proportionate magnitude and directly in phase with the A.-C. signal from the measuring network.

10. A stage of magnetic amplification adapted to supply a single A.-C. output variable in phase and magnitude with the direction and proportionate magnitude of the ratio to two D.-C. signals each variable from unity in opposite directions, in combination, a bridge circuit having four similar arms, an A.-C. source energizing one diagonal of said bridge, a conjugate output for said bridge, each arm comprising saturable core means having a pair of parallel connected and oppositely rectified output windings, and two D.-C. signal windings effectively associated with the cores in each pair of opposite arms, the last mentioned windings being respectively energized by the two D.-C. signals and being oppositely poled on each reactor and reversed on adjacent arms.

11. The amplifier stage as defined in claim 10 in which there is a D.-C. bias winding for each pair of oppositely poled signal windings, the bias windings on adjacent arms being poled oppositely in respect to signal windings thereon connected in the same signal circuit.

12. The magnetic amplifier stage of claim 10 in which the windings for opposite arms are all arranged on two cores, each one having thereon two corresponding output windings, the D.-C. signal windings being each common to both cores.

13. The magnetic amplifier stage of claim 12 in which the windings for opposite arms are all arranged on two cores, each one having thereon the two corresponding output windings of opposite arms, the D.-C. signal and the bias windings being each common to both cores.

14. A stage of magnetic amplification adapted to supply dual D.-C. outputs variable in relative direction and magnitude from unity ratio in proportion to two D.-C. signals each variable from unity ratio in opposite directions, in combination, a set of two pairs of magnetically saturable cores, an output winding on each core, two equivalent in phase A.-C. power sources for the windings of each pair, each winding having a pair of oppositely poled rectifiers in series therewith and the two windings and their rectifiers of a pair being connected in parallel to their power source, a D.-C. output circuit being tapped from between the rectifiers of each pair, a pair of input reactance windings on and common to each pair of cores, said last mentioned windings of each pair being poled to produce opposing fluxes in the respective core pairs, one winding of each last mentioned pair being connected in series with one in the other pair and to one of the D.-C. signals, a D.-C. energized biasing winding common to each pair of cores and poled to oppose the self saturating flux of the output windings therein.

15. The magnetic amplifier stage of claim 14 in which manual adjusting means is supplied to regulate the relative bias fluxes of the pair of cores.

References Cited in the file of this patent

UNITED STATES PATENTS

| 2,477,729 | Fitzgerald | Aug. 2, 1949 |
| 2,518,865 | Cartotto | Aug. 15, 1950 |
| 2,636,150 | McKenney et al. | Apr. 21, 1953 |

OTHER REFERENCES

Trade publication, "Magnetic Amplifiers," Vickers Electric Division, St. Louis, Mo., 1949.

Proceedings of the IRE, September 1951, page 1018.

Westinghouse Engineer, September 1950, pages 201 and 202.